Figure 1:
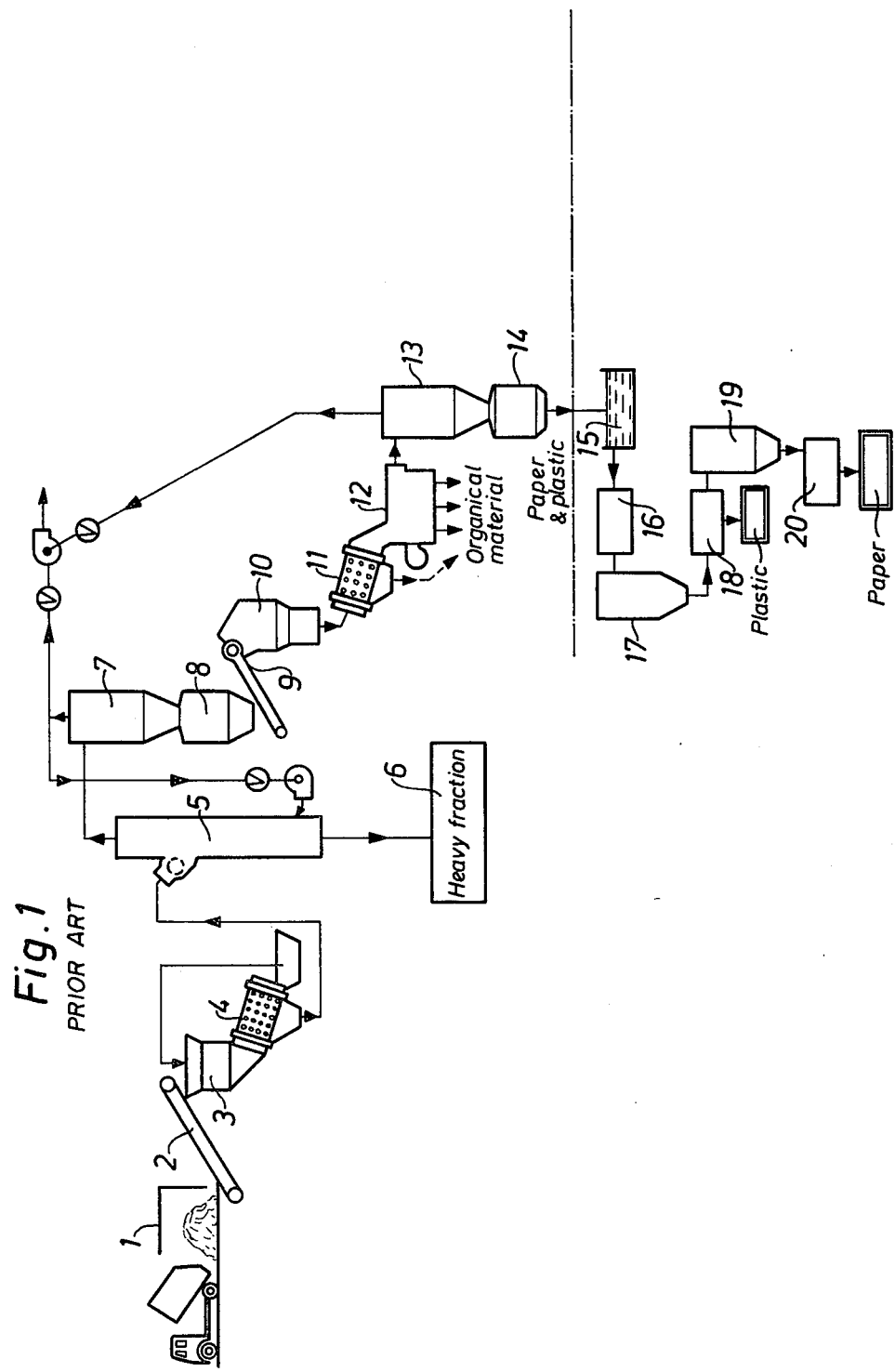

United States Patent [19]

Bahri, deceased et al.

[11] 4,034,862

[45] July 12, 1977

[54] METHOD AND APPARATUS FOR SEPARATING PAPER AND PLASTIC

[75] Inventors: Marcel Selim Bahri, deceased, late of Saltsjo-Duvnas, Sweden; by Elin Bahri, heir and legal successor; heir and legal successor Bahri, both of Saltsjo-Duvnas, Sweden; Jan-Mats Eneroth, Vaxjo, Sweden

[73] Assignee: AB Svenska Flaktfabriken, Nacka, Sweden

[21] Appl. No.: 637,650

[22] Filed: Dec. 4, 1975

[30] Foreign Application Priority Data

Dec. 6, 1974 Sweden .............................. 7415328

[51] Int. Cl.² .......................................... B07B 13/00
[52] U.S. Cl. .................................. 209/11; 209/144
[58] Field of Search ................. 209/11, 138, 139 R, 209/143, 144, 3; 34/57 R, 57 A, 10

[56] References Cited

U.S. PATENT DOCUMENTS

| | | |
|---|---|---|
| 2,818,935 | 1/1958 | Kemmetmuller ................ 55/347 X |
| 3,300,870 | 1/1967 | Sugahara et al. .................. 34/57 R |
| 3,713,225 | 1/1973 | Mark ..................................... 34/10 |
| 3,814,240 | 6/1974 | Laundrie ............................. 209/11 |
| 3,843,060 | 10/1974 | Colburn ............................. 241/24 |

Primary Examiner—Frank W. Lutter
Assistant Examiner—Ralph J. Hill
Attorney, Agent, or Firm—Flynn & Frishauf

[57] ABSTRACT

To improve the energy balance of the method, air heated to a temperature at which the mixture can be dried is brought in contact with the mixture in form of an air-stream, which also conveys the mixture through the plant during the process. This moist air giving off most of its heat during drying is vented, and the dried mixture is subsequently conveyed for exposure to a stream of hot air to effect separation of plastic and paper from each other, the resulting particles then being separated in an air classifier, or cyclone, and the heated dry air being recirculated to the entry point of the plant for reuse in the process to dry additional moist material being introduced therein.

9 Claims, 4 Drawing Figures

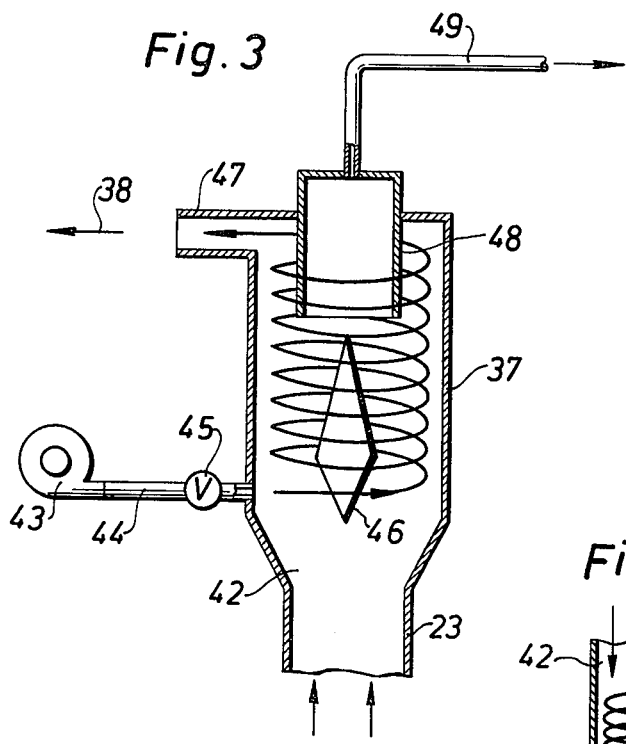
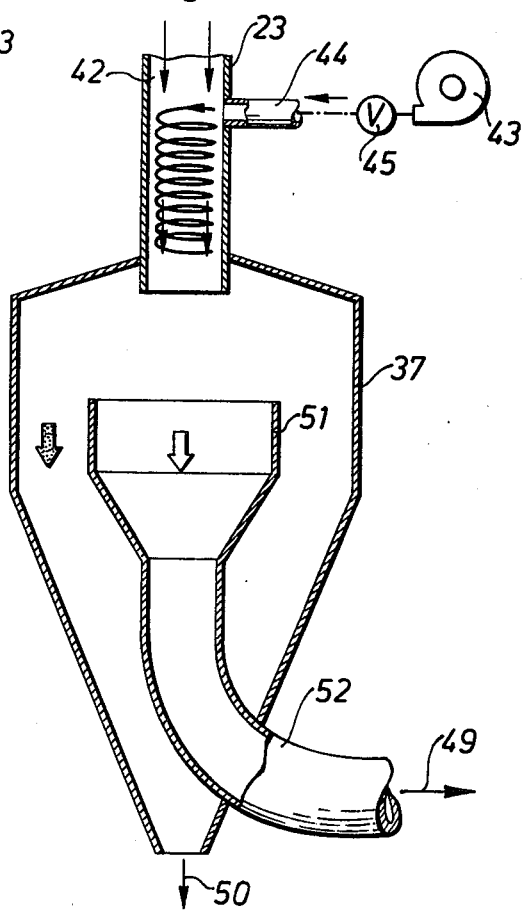

METHOD AND APPARATUS FOR SEPARATING PAPER AND PLASTIC

The present invention relates to a method of separating thermoplastic materials in the form of films from a moist mixture of paper and plastics, causing the mixture while being conveyed through a gas stream to be dried and heated to a temperature at which the plastics film contracts, forming particles of a higher unit weight than that of the film, after which he plastic particles and the paper are separated and collected individually; and to a device for carrying out the said process. The invention is applicable especially to the treatment of domestic wastes in plants for recovery of valuable constituents of such wastes.

In a recovery system as described a purified mixture of paper and plastics is obtained by passing untreated domestic waste through a series of apparatuses, such as a primary mill, various screens, and a secondary or grinding mill. The latter is incorporated for the purpose of reducing the volume of the paper and plastics material and homogenizing it prior to further treatment.

A number of methods of separating paper from a mixture of paper and plastics are known.

One of these methods is based on the principle of electrostatics, according to which the moist paper fraction becomes charged whereas the plastics, which does not absorb moisture, remains unaffected by the field, thus causing separation to occur.

Another method is based on a thermal principle, according to which thermoplastics, which form the main plastics constituent of the mixture, become pliable in contact with a hot surface, such as a heated rotating roller, and adhere to that surface. The plastics are subsequently scraped off whereas the paper fraction passes the hot surface unaffected.

According to a third known method the mixture of paper and plastics is heated in a stream of hot air of a certain temperature, which causes the plastics components of the mixture to contract, thereby increasing the unit weight and dropoff speed of the plastics, which can then be removed from the paper fibres by a conventional air classifier. This third method is described in U.S. Pat. No. 3,814,240.

The present invention, which is based on the third or last-mentioned method, aims at a new way of thinking in respect of the heat economy of the system. It is known that thermoplastics when being conveyed by hot air stream become contracted as a function of the air-stream temperature and the holding time at that temperature. The higher the temperature of the air, the shorter the holding time necessary to produce the surface reduction at that temperature and vice versa.

The upper limit of the temperature is set by the necessity of keeping a certain margin between the temperature of the plastic and the flash, or ignition temperature of the paper, which is in the range, 220° – 245 ° C. Thermoplastics begin to contract at a temperature of about 120° C; in this case, however, a comparatively long holding time is required, which entails extensive and expensive drying means. For this reason the outlet temperaure of the dryer, i.e., the temperature within the exhaust stack in the experiments described in the literature, has been kept at 120° – 180° C, causing considerably heat losses. It is well known that the mixture of paper and plastics contains water. In the experiments previously described the drying means has been a so-called agricultural crop dehydrator in which the mixture is dried and heated at the desired temperature. It is an object of the present invention to substantially reduce such heat losses.

Subject matter of the present invention the drying operation is effected in a first stage, best in a pneumatic conveying dryer that is specially designed for this purpose, resulting in a moderate exhaust-stack temperature after the dryer. The dry mixture then passes through a second stage, which is a heating stage enabling the desired air-stream temperature and holding time to be maintained, and causing the plastics contents to become contracted and removed from the paper contents. The second stage should comprise a heating column with a column with a built-in air classifier. The comparatively hot air is returned from the second stage to the first stage, i.e., to the pneumatic conveying dryer.

In addition to the improvement in energy use that is acheived by a plant according to the present invention, the air classifier, can be designed, in one embodiment, as an integral part of the heating column.

Figure 2:
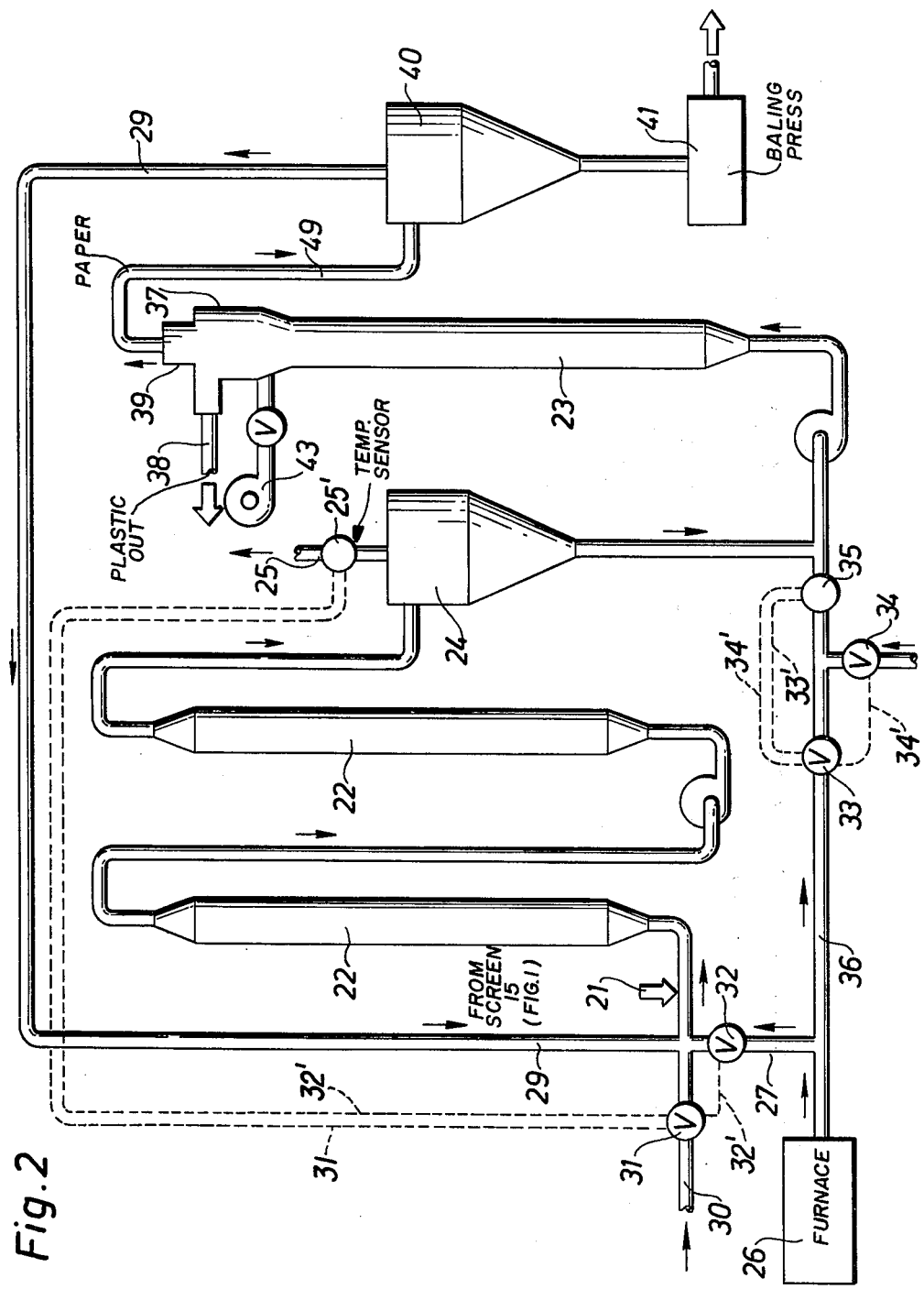

In the following description of the invention reference is made to the appended drawings, of which FIG. 1 shows diagrammatically a conventional plant or waste sorting, including a device of known design for separating paper and plastics waste, FIG. 2 illustrates a plant for separation of paper and plastics waste according to the invention, and FIGS. 3 and 4 show alternative designs of air classifiers to be incorporated in a plant according to the invention.

The recovery plant illustrated in FIG. 1 comprises a dumping station 1 at which the waste is deposited. A conveyor 2 transports the deposited material to a crusher 3 and thence to an air classifier 5, here shown in a vertical design. Between the crusher and the air classifier a drum screen 4 has been inserted to prevent elongated objects, such as textiles and plastics, from reaching the air classifier. Such objects returned to the dumping station 1. The waste entering the air classifier 5 is separated into a heavy fraction 6, mainly consisting of metals, glass, stone, and food scraps, and a light fraction, containing the main part of the paper and plastics present in the waste. The light fraction is conveyed by pneumatic means to a cyclone 7. This mixture is fed by belt conveyor from a container 8 below the cyclone to a secondary, grinding mill 10. The particle size of the material leaving the mill 10 is of the order of magnitude, 10 – 50 mm. The waste is conveyed through a drum screen 11 to a horizontal air classifier 12 in which paper and plastics are separated from the rest of the organic waste. The purpose of the apparatuses following the secondary mill is to achieve as high a degree of purity as possible with respect to the paper - plastics mixture; this goal is attained when the said mixture has passed through a cyclone 13 and been collected in a container 14.

In a subsequent plant section the design of which is already known per se, the paper - plastics mixture is screened on a vibrating double screen 15 that separates fragments of the desired size (e.g., 10 – 50 mm) from the mixture, which are then carried along whereas the remaining material is destroyed. Drying and heating in a dryer 16 causes the plastics material, mainly thermoplastics, to contract resulting in a higher weight per unit volume and higher falling speed of the plastics. The delivery air is separated in a cyclone 17, the plastics and paper material then being separated in an air classifier 18. The paper fraction passes an additional cyclone 19 and is then collected in a container 20.

The methods so far described involve utilization of a so-called agricultural crop dehydrator to effect drying and heating of the mixture. This implies that the temperature of the gas discharged from the dryer, i.e., the gas temperature in the exhaust stack, will range from 120° to 180° C, entailing considerable heat losses. A further disadvantage is that the agricultural crop dehydrator is not adaptable to this particular application. Dryers of this type have certain hot zones in which the paper material may catch fire. Also, the thermoplastics soften when reaching these hot surfaces, which may easily cause obstruction of the apparatus.

The plant according to the present invention is intended to eliminate such disadvantages. After passing through the vibrating double screen 15 as shown in FIG. 1 the mixture of paper and plastics enters the plant (FIG. 2) at the arrow denoted 21 and is then conveyed to the drying columns 22, which preferably are of the pneumatic conveying dryer type. The mixture is thus first dried in drying columns 22 and is then heated in a separate heating column 23 in which the main part of the resultant plastics contraction takes place. Part of the contraction may, however, also occur already in the drying stage. Owing to the evaporation taking place in the dryers 22, th outlet air temperature at the drying columns 22 and at a cyclone 24 is comparatively low. Thus, the air temperature at exit point 25 of the said cyclone may be about 70° − 80° C, which eliminates the high heat loss mentioned previously. The temperature at exit 25 is sensed by 25'. The hot air required in the heating column 23, on the other hand, is recirculated to the dryers 22. Furthermore, the design of the dryers is such as to eliminate the occurrence of dead zones and, thus, of points of local high temperature. Since the material is conveyed continuously by pneumatic means through these dryers the above-mentioned disadvantages do not occur. In FIG. 2, 26 signifies a furnace, which may be a gas furnace or an oil-fired furnace, producing hot gases that are fed to the serial drying columns 22 by a duct 27 and to the heating column 23 by another duct 36. The dryers 22 supplied with hot gas from the furnace 26, with gas recirculated from the heating column 23 by means of another duct 29, and with fresh air by a third duct 30. Valves 31 and 32 controlled from sensor 25' as schematically shown by broken lines 31', 32' control the flows of gas as a function of the temperature of the air at the outlet 25 of cyclone 24 as sensed by sensor 25'. The composition of the mixture of furnace gas and outside air is also controlled by valves 33 and 34, respectively, by means of a temperature sensor 35 that is arranged in duct 36 before the entry point for the material from the cyclone 24. The dimensions of the heating column 23 are such as to provide a holding time for the material in the column that is sufficient to permit change the plastic fragments to contract during the final part of their passage through the column. The upper end of the column 23 incorporates an air classifier in the form of a cyclone separator 37 in which the plastic fragments are separated from the paper. The plastic is removed by centrifugal force through a radial duct 38 whereas the paper is carried along by the stream of gas through an axial outlet 39 to a cyclone 40. The paper fibres accummulating in cyclone 40 are fed to a baling press 41 and are then available for re-use. The hot gas from cyclone 40 is recirculated to the dryers 22 by duct 29. The plastic fragments removed by the cyclone separator 37 are discharged by duct 38 to a closed waste vessel or container. FIG. 3 illustrates in detail one embodiment of the above-mentioned cyclone separator 37, here arranged at the top of the heating column 23. Maximum contraction of the plastics occurs within the column section denoted 42. The secondary air needed for attaining the centrifugal force that is required to separate the heavy plastics fraction from the paper, is provided by a secondary blower 43 through duct 44 and a control valve 45. The cyclone 37 contains an inner element 46. The feed duct 44 enters the cylindrical cyclone body tangentially. An outlet 47 for the plastics fragments is arranged tangentially further up the cyclone body. The gas and the light paper fraction are discharged by an axial central pipe 48 to cyclone 40 by a duct 49.

Another possible embodiment of the cyclone separator is illustrated diagrammatically in FIG. 4. In this case the heating column 23 is of a two-stage design, the stream of gas and pneumatically conveyed mixture consequently being fed to the cyclone separator from above. The secondary air is entered through a tangential inlet 44 as in the embodiment previously described. The plastics fragments are whirled towards the cyclone wall and subsequently discharged through a bottom outlet 50 and collected in a closed waste vessel whereas the stream of gas, carrying the paper, is collected by a funnel 51 and then discharged by a bent pipe 52 into duct 49 and cyclone 40.

Although the description presented above refers to a mixture of paper and plastics obtained from domestic waste the invention can obviously be applied also to paper - plastics waste material of other origins, such as industrial and office waste, etc.

According to the description the final separation of the paper and plastics fractions takes place in an air classifier. Although the illustration shows only one air classifier a system of serial air classifiers can be incorporated to achieve a higher degree of purity of the paper fraction if required.

We claim:

1. Method to separate thermoplastic material in the form of film from a moist mixture of paper and plastic, including the step of conveying the mixture by a gas stream at an elevated temperature, the gas absorbing moisture while the mixture becomes dried and heated to a temperature at which the plastic film fragments contract to particles of higher weight per unit volume than that of the film;

separating the plastic particles and paper;

and separately collecting the plastic particles and the paper the improvement wherein said conveying step comprises, conveying said mixture in a first gas stream at an elevated temperature to dry said mixture, freely releasing the moist first gas stream following the drying operation, conveying said mixture in a second hot dry gas stream to cause the thermoplastic film fragments to contract and form particles.

recirculating the second gas stream to form said first gas stream subsequent to said collecting step.

2. Method according to claim 1, wherein the first gas stream is at a temperature such that the moist air, after the drying operation, will have a temperature below the contraction temperature of the plastics fragments;

and the step of recirculating the gas comprises recirculating dry air of a temperature below the flashing temperature of the paper.

3. Thermoplastic and paper separating plant, for separating thermoplastic material in form of a film from a moist mixture of paper and plastics having drying means;

means conveying, by a stream of air, the moist mixture of paper and plastics through the drying means a cyclone connected to the drying means to receive the moist air and dried mixture conveyed by the air stream;

means venting the moist air from the cyclone to escape to the outer, ambient air;

means connected to the cyclone for receiving the dried mixture and conveying said mixture in a hot dry gas to a heating means wherein said plastic is caused to contract and form film particles of a higher weight per unit volume while leaving the paper unaffected;

means for separating and means for separately collecting the plastic particles and the paper;

and recirculating duct means pneumatically connected to the heating means and to the drying means to recirculate the hot, dry air derived from the heating means and to supply at least a portion of the stream of the air to the drying means.

4. Plant according to claim 3, wherein the drying means comprises at least one column through which the mixture is conveyed by means of the stream of heated air.

5. Plant according to claim 3, wherein the heating means comprises at least one column and an air classifier located at the outlet thereof which comprises said separating means for removing the plastic particles formed in the column from the mixture conveyed by the hot air.

6. Plant according to claim 5, wherein the air classifier at the outlet of the column is an upward stream axial feed classifier feeding the mixture from below.

7. Plant according to claim 5 wherein the air classifier at the outer end of the column is a downward stream axial feed classifier through which the mixture is fed from above.

8. Plant according to claim 3 said collecting means comprising a further cyclone, arranged downstream of the heating apparatus in the direction of the flow of the stream of air to remove paper from the hot delivery air, the circulating duct being connected to the cyclone to recirculate the air and reintroduce the air into the conveying means at the point in advance of the introduction of the moist mixture thereinto.

9. Plant according to claim 8, wherein the drying means comprises at least one column through which the mixture is conveyed by means of the stream of heated air;

and wherein the heating means comprises at least one column and an air classifier located at the outlet which comprises said separating means for removing the plastic particles formed in the column from the mixture conveyed in the air, the air classifier being an axial feed classifier.

* * * * *